United States Patent
Gao et al.

(10) Patent No.: US 11,497,024 B2
(45) Date of Patent: Nov. 8, 2022

(54) TRANSMISSION METHOD AND DEVICE (71) Applicant: CHINA ACADEMY OF TELECOMMUNICATIONS TECHNOLOGY, Beijing (CN)

(72) Inventors: Xuejuan Gao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/770,898

(22) PCT Filed: Nov. 2, 2018

(86) PCT No.: PCT/CN2018/113701
§ 371 (c)(1),
(2) Date: Jun. 8, 2020

(87) PCT Pub. No.: WO2019/109765
PCT Pub. Date: Jun. 13, 2019

(65) Prior Publication Data
US 2020/0404666 A1    Dec. 24, 2020

(30) Foreign Application Priority Data
Dec. 8, 2017    (CN) .......................... 201711296393.5

(51) Int. Cl.
*H04W 72/04* (2009.01)
*H04B 7/06* (2006.01)
(Continued)

(52) U.S. Cl.
CPC ...... *H04W 72/0493* (2013.01); *H04B 7/0626* (2013.01); *H04L 1/1819* (2013.01);
(Continued)

(58) Field of Classification Search
None
See application file for complete search history.

(56) References Cited

U.S. PATENT DOCUMENTS

2010/0195575 A1   8/2010  Papasakellariou et al.
2012/0120817 A1*  5/2012  Khoshnevis ............ H04L 5/001
                                                     370/252
(Continued)

FOREIGN PATENT DOCUMENTS

CN    102378254 A    3/2012
CN    103686858 A    3/2014
(Continued)

OTHER PUBLICATIONS

First Office Action and search report from CN app. No. 201711296393. 5, dated Dec. 25, 2019, with English translation from Global Dossier.
(Continued)

*Primary Examiner* — Otis L Thompson, Jr.
(74) *Attorney, Agent, or Firm* — Ladas & Parry, LLP (57) ABSTRACT

The disclosure provides a transmission method and device. The transmission method includes: receiving, by a user equipment, configuration information for indicating whether transmission of uplink control information on a first physical uplink shared channel is supported; and transmitting, by the user equipment, the first physical uplink shared channel and/or the uplink control information based on the configuration information.

16 Claims, 4 Drawing Sheets

(51) Int. Cl.
*H04L 1/18* (2006.01)
*H04L 5/00* (2006.01)
*H04W 72/12* (2009.01)
*H04W 72/14* (2009.01)
*H04W 80/02* (2009.01)
*H04W 80/08* (2009.01)

(52) U.S. Cl.
CPC ....... *H04L 5/0055* (2013.01); *H04W 72/0413* (2013.01); *H04W 72/0446* (2013.01); *H04W 72/1257* (2013.01); *H04W 72/14* (2013.01); *H04W 80/02* (2013.01); *H04W 80/08* (2013.01)

(56) References Cited

U.S. PATENT DOCUMENTS

| | | | |
|---|---|---|---|
| 2013/0083766 A1* | 4/2013 | Chung | H04W 72/0413 370/329 |
| 2013/0155832 A1 | 6/2013 | Yang et al. | |
| 2014/0029684 A1 | 1/2014 | Shirani-Mehr et al. | |
| 2015/0163794 A1 | 6/2015 | Liang et al. | |
| 2016/0174211 A1 | 6/2016 | Gao et al. | |
| 2017/0264401 A1 | 9/2017 | Soong et al. | |
| 2018/0159665 A1 | 6/2018 | Yang et al. | |
| 2018/0288746 A1* | 10/2018 | Zhang | H04L 5/0048 |
| 2018/0295651 A1* | 10/2018 | Cao | H04W 74/0833 |
| 2019/0037586 A1* | 1/2019 | Park | H04L 1/0031 |
| 2019/0053097 A1* | 2/2019 | Rico Alvarino | H04L 1/0026 |
| 2019/0199477 A1* | 6/2019 | Park | H04L 1/0693 |
| 2019/0223201 A1* | 7/2019 | Lee | H04L 5/0048 |
| 2020/0028609 A1* | 1/2020 | Ahn | H04W 24/08 |
| 2020/0163155 A1* | 5/2020 | Lee | H04W 72/1289 |

FOREIGN PATENT DOCUMENTS

| | | |
|---|---|---|
| CN | 103796318 A | 5/2014 |
| CN | 104348589 A | 2/2015 |
| CN | 104396174 A | 3/2015 |
| CN | 104601303 A | 5/2015 |
| EP | 3646502 A1 | 5/2020 |
| WO | 2017003265 A1 | 1/2017 |
| WO | 2019033071 A1 | 2/2019 |

OTHER PUBLICATIONS

International Search Report from PCT/CN2018/113701, dated Jan. 30, 2019, with English translation from WIPO.
Written Opinion of the International Searching Authority from PCT/CN2018/113701, dated Jan. 30, 2019, with English translation from WIPO.
International Preliminary Report on Patentability from PCT/CN2018/113701, dated Jun. 9, 2020, with English translation from WIPO.
"UCI on PUSCH and UL channel multiplexing for NR", R1-1719927, 3GPP TSG RAN WG1 Meeting 91, Reno, USA, Nov. 27-Dec. 1, 2017.
"Multiplexing of UCI and UL data on PUSCH", R1-1720200, 3GPP TSG RAN WG1 Meeting 91, Reno, USA, Nov. 27-Dec. 1, 2017.
Extended European Search Report from EP app. No. 18884864.2, dated Jan. 13, 2021.

* cited by examiner

TRANSMISSION METHOD AND DEVICE

CROSS-REFERENCE TO RELATED APPLICATIONS

The present application is the U.S. national phase of PCT Application No. PCT/CN2018/113701 filed on Nov. 2, 2018, which claims a priority to the Chinese patent application No. 201711296393.5 filed on Dec. 8, 2017, the disclosures of which are incorporated herein by reference in their entireties.

TECHNICAL FIELD

The present disclosure relates to the field of communication technology, in particular to a transmission method and device.

BACKGROUND

In a Long Term Evolution (LTE) wireless communication system, when a Physical Uplink Shared Channel (PUSCH) and uplink control information (UCI) are simultaneously transmitted by a User Equipment (UE) in a sub-frame, if the UE supports simultaneous transmission of the Physical Uplink Control Channel (PUCCH) and the PUSCH, the UCI may be transmitted on the PUCCH, data may be transmitted on the PUSCH, and if the UE does not support simultaneous transmission of the PUCCH and the PUSCH, the UCI may be transmitted on the PUSCH together with the data. The UCI may at least include Hybrid Automatic Repeat reQuest ACKnowlegement (HARQ-ACK), Channel State Information (CSI), and Scheduling Request (SR).

In the LTE system, the HARQ-ACK transmits the data on the PUSCH by puncturing the data on the PUSCH, that is, when channel coding and rate matching are performed on the data on the PUSCH, whether the HARQ-ACK exists is not considered, that is, channel coding and rate matching are performed based on the assumption that no resource is occupied by the HARQ-ACK. When the HARQ-ACK exists, the HARQ-ACK is mapped to a corresponding resource for transmission according to a predetermined mapping rule. In this case, the HARQ-ACK information covers the data information on the resource, that is, the data information is punctured by the HARQ-ACK. The method may ensure that the coding and rate matching of the data is not affected by the presence or absence of HARQ-ACK, thereby ensuring that the evolved Node Base station (eNB) and the UE have a consistent understanding of the bit rate of the transmitted data. This is because, when the eNB sends downlink data to the UE, based on the fixed HARQ-ACK feedback timing defined in LTE, the eNB expects the UE to feed back the HARQ-ACK of the downlink data at the corresponding feedback time. However, if the UE loses the downlink transmission, the UE side cannot feed back the HARQ-ACK of the downlink transmission. Therefore, the eNB and the UE may have inconsistent understanding of whether the HARQ-ACK transmission exists at the corresponding feedback time. When the PUSCH exists at the corresponding feedback time and the UE does not support simultaneous transmission of the PUCCH and the PUSCH, since the HARQ-ACK is transmitted on the PUSCH by puncturing the data information, even if the eNB and the UE have inconsistent understanding of whether the HARQ-ACK transmission exists, the eNB does not affect the process of decoding and rate matching the data transmitted by the UE.

In the fifth generation mobile communication technology (5G) new air interface (NR), in addition to supporting the fixed HARQ-ACK feedback timing (that is, it is predefined or configured that in which moment the HARQ-ACK during downlink transmission is fed back), the dynamic HARQ-ACK feedback timing is also supported, that is, in which moment the HARQ-ACK during a downlink transmission is fed back is indicated by Downlink Control Information (DCI) corresponding to the downlink transmission. In addition, 5G NR also supports mini-slot-based transmission, that is, the transmission length of one downlink transmission may be shorter than the length of all downlink symbols in one slot or one slot, for example, transmission of any symbol length such as 1, 2, 4, and 7, and HARQ-ACK feedback based on Code Block Group (CBG) and multi-carrier transmission are also supported. These factors may result in a large increase in feedback bits quantity of HARQ-ACK compared with LTE. If HARQ-ACK is still transmitted on the PUSCH by puncturing data on the PUSCH, a large amount of data information of the PUSCH is punctured by the HARQ-ACK, and transmission performance of the PUSCH is greatly affected. Therefore, in 5G NR, a puncturing mode is used for the transmission of 1 to 2 bits of HARQ-ACK on PUSCH, and a rate matching mode is used for the transmission of HARQ-ACK on PUSCH greater than 2 bits, that is, the resource occupied by HARQ-ACK is removed when encoding and rate matching are performed on data on PUSCH.

If the HARQ-ACK is transmitted on the PUSCH in a rate matching mode, the quantity of bits of the HARQ-ACK and whether the HARQ-ACK exists may affect the coding and rate matching of the data on the PUSCH (that is, the code rate of the data is affected), and the actual mapping resource location. If the quantity of bits of the HARQ-ACK and whether the HARQ-ACK exists recognized by a next generation node base station (gNB) are not consistent with the actual transmission of the UE, the gNB will decodes the PUSCH wrongly, causing the PUSCH reception failure. In 5G NR, for a PUSCH having an uplink grant (UL grant), a Downlink Assignment Index (DAI) may be included in the UL grant for indicating the quantity of bits of HARQ-ACK transmitted on the PUSCH, and it is possible to comprehensively determine whether there is an HARQ-ACK transmission based on the information field and the quantity of actually received downlink transmissions.

The 5G NR also supports PUSCH transmission without a corresponding UL grant, such as Semi-Persistent Scheduling (SPS) PUSCH and grant-free PUSCH. That is, the base station does not transmit any scheduling information to the grant-free PUSCH, and only configures the location where the UE can perform grant-free PUSCH transmission and some configuration information by using Radio Resource Control (RRC) signaling, and the UE performs grant-free PUSCH transmission based on the configuration information in the location pre-configured by the base station. It is also possible to support PUSCH with corresponding UL grant but without DAI in UL grant. When the HARQ-ACK and the PUSCH occur at the same time and simultaneous transmission of the PUCCH and the PUSCH is not supported, if the gNB transmits downlink transmission to the UE, but the UE does not receive any downlink transmission, the UE only transmits data on the PSUCH and does not carry the HARQ-ACK, that is, the rate matching of the data on the PUSCH is performed without the HARQ-ACK, but the base station cannot determine that the UE does not receive any downlink transmission, and still detects the HARQ-ACK and the PUSCH based on the rate matching mode in which the HARQ-ACK exists on the PUSCH, which causes the base station to wrongly understand the resource occupation location and size of the PUSCH data, and causes decoding wrongly, thereby causing the PUSCH reception failure.

In 5G NR, when the rate matching mode is used for the transmission of the HARQ-ACK on the PUSCH, if the UE and the base station do not have consistent understanding on whether the HARQ-ACK exists on the PUSCH, the determination on the size of the resource actually applied to the data transmission on the PUSCH is inconsistent, and the result of the rate matching of the data is inconsistent, and the base station fails to receive the transmission of the PUSCH.

SUMMARY

Regarding the above technical problem, the present disclosure provides a transmission method and device, to solve the problem that the base station fails to receive the transmission of the PUSCH due to the determination on the size of the resource actually applied to the data transmission on the PUSCH being inconsistent.

In a first aspect, a transmission method includes: receiving, by a user equipment (UE), configuration information for indicating whether transmission of uplink control information (UCI) on a first physical shared channel (PUSCH) is supported; and transmitting, by the UE, the first PUSCH and/or the UCI based on the configuration information.

Optionally, when the configuration information indicates that the transmission of the UCI on the first PUSCH is not supported, the transmitting, by the UE, the first PUSCH and/or the UCI based on the configuration information includes: transmitting, by the UE, only the first PUSCH on transmission resource of the first PUSCH, or determining, by the UE, that there is no UCI on the first PUSCH.

Optionally, when the configuration information indicates that the transmission of the UCI on the first PUSCH is not supported, the transmitting, by the UE, the first PUSCH and/or the UCI based on the configuration information includes: if the UCI exists at a transmission time of the first PUSCH, transmitting, by the UE, the first PUSCH on a transmission resource of the first PUSCH, and transmitting the UCI on a transmission resource of the UCI, wherein the transmission resource of the UCI does not overlap with the transmission resource of the first PUSCH; or if the UCI exists at the transmission time of the first PUSCH, delaying, by the UE, to transmit the UCI at a first predetermined time; or transmitting, by the UE, the first PUSCH on the transmission resource of the first PUSCH at a first transmission time, and transmitting the UCI on the transmission resource of the UCI at a second transmission time, wherein the first transmission time does not overlap with the second transmission time.

Optionally, when the configuration information indicates that the transmission of the UCI on the first PUSCH is supported, the transmitting, by the UE, the first PUSCH and/or the UCI based on the configuration information includes: if the UCI exists at a transmission time of the first PUSCH, transmitting, by the UE, the UCI on the first PUSCH; or if the UCI exists at the transmission time of the first PUSCH, and when simultaneous transmission of a physical uplink control channel (PUCCH) and the PUSCH are not supported, transmitting, by the UE, the UCI on the first PUSCH; or transmitting, by the UE, the UCI on the first PUSCH based on a predefined or configured quantity of bits of UCI.

Optionally, the receiving, by the UE, configuration information includes: receiving, by the UE, higher layer signaling, Media Access Control (MAC) signaling, or L1 signaling, wherein the higher layer signaling, the MAC signaling, or the L1 signaling comprises the configuration information.

Optionally, the L1 signaling is transmitted through a physical downlink control channel (PDCCH).

Optionally, the PDCCH is a multicast PDCCH or a UE-specific PDCCH, and the UE-specific PDCCH is a PDCCH corresponding to the first PUSCH.

Optionally, the configuration information is first indication information of a predetermined quantity of bits, wherein a first state of the first indication information indicates that transmission of the UCI on the first PUSCH is supported, and a second state of the first indication information indicates that transmission of the UCI on the first PUSCH is not supported.

Optionally, the configuration information is a first configuration parameter, the first configuration parameter is "TRUE" indicating that that transmission of the UCI on the first PUSCH is supported, and the first configuration parameter is "FALSE" indicating that that transmission of the UCI on the first PUSCH is not supported.

Optionally, the UCI is one or more of a hybrid automatic repeat request acknowledgement (HARQ-ACK) and channel state information (CSI).

Optionally, the configuration information is only applied only to HARQ-ACK; or the configuration information is only applied to CSI; or the configuration information is applied to HARQ-ACK and CSI.

Optionally, the configuration information is applied to HARQ-ACK and CSI includes: the HARQ-ACK and the CSI correspond to the same configuration information, or the HARQ-ACK and the CSI correspond to independent configuration information, respectively.

Optionally, before the UE receives configuration information, the method further includes: determining whether at least one of predetermined conditions is met, and when at least one of the predetermined conditions is met, receiving, by the UE, the configuration information; wherein the predetermined conditions include one or more of: the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

Optionally, the first PUSCH is any one of a PUSCH without a corresponding uplink (UL) grant and a PUSCH without a corresponding downlink assignment index (DAI); or the first PUSCH is any one of a semi-persistent scheduling (SPS) PUSCH, a grant-free PUSCH, a PUSCH having a corresponding UL grant but no DAI in the UL grant.

In a second aspect, a transmission method includes: transmitting, by a network side device, configuration information for indicating whether transmission of UCI on a first PUSCH is supported; and receiving, by the network side device, the first PUSCH and/or the UCI based on the configuration information.

Optionally, when the configuration information indicates that the transmission of the UCI on the first PUSCH is not supported, the receiving, by the network side device, the first PUSCH and/or the UCI based on the configuration information includes: receiving, by the network side device, only the first PUSCH on transmission resource of the first PUSCH, or determining, by the network side device, that there is no UCI on the first PUSCH.

Optionally, when the configuration information indicates that the transmission of the UCI on the first PUSCH is not supported, the receiving, by the network side device, the first PUSCH and/or the UCI based on the configuration information includes: if the UCI exists at a transmission time of the first PUSCH, receiving, by the network side device, the first PUSCH on a transmission resource of the first PUSCH, and receiving the UCI on a transmission resource of the UCI, wherein the transmission resource of the UCI does not overlap with the transmission resource of the first PUSCH; or, delaying, by the network side device, to receive the UCI at a first predetermined time; or receiving, by the network side device, the first PUSCH on the transmission resource of the first PUSCH at a first receiving time, and receiving the UCI on the transmission resource of the UCI at a second receiving time, wherein the first receiving time does not overlap with the second receiving time.

Optionally, when the configuration information indicates that the transmission of the UCI on the first PUSCH is supported, the receiving, by the network side device, the first PUSCH and/or the UCI based on the configuration information includes: if the UCI exists at a transmission time of the first PUSCH, receiving, by the network side device, the UCI on the first PUSCH; or if the UCI exists at the transmission time of the first PUSCH, and when simultaneous transmission of a physical uplink control channel (PUCCH) and the PUSCH are not supported, receiving, by the network side device, the UCI on the first PUSCH; or receiving, by the network side device, the UCI on the first PUSCH based on a predefined or configured quantity of bits of UCI. Optionally, the transmitting, by a network side device, configuration information includes: transmitting, by the network side device, higher layer signaling, Media Access Control (MAC) signaling, or L1 signaling, wherein the higher layer signaling, the MAC signaling, or the L1 signaling comprises the configuration information.

Optionally, the L1 signaling is transmitted through a PDCCH.

Optionally, the PDCCH is a multicast PDCCH or a UE-specific PDCCH, and the UE-specific PDCCH is a PDCCH corresponding to the first PUSCH.

Optionally, the configuration information is first indication information of a predetermined quantity of bits, wherein a first state of the first indication information indicates that transmission of the UCI on the first PUSCH is supported, and a second state of the first indication information indicates that transmission of the UCI on the first PUSCH is not supported.

Optionally, the configuration information is a first configuration parameter, the first configuration parameter is "TRUE" indicating that that transmission of the UCI on the first PUSCH is supported, and the first configuration parameter is "FALSE" indicating that that transmission of the UCI on the first PUSCH is not supported.

Optionally, the UCI is one or more of HARQ-ACK and CSI.

Optionally, the configuration information is only applied only to HARQ-ACK; or the configuration information is only applied to CSI; or the configuration information is applied to HARQ-ACK and CSI.

Optionally, the configuration information is applied to HARQ-ACK and CSI includes: the HARQ-ACK and the CSI correspond to the same configuration information, or the HARQ-ACK and the CSI correspond to independent configuration information, respectively.

Optionally, before the transmitting, by a network side device, configuration information, the method further includes: determining whether at least one of predetermined conditions is met, and when at least one of the predetermined conditions is met, transmitting, by the network side device, the configuration information; wherein the predetermined conditions include one or more of: the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

Optionally, the first PUSCH is any one of a PUSCH without a corresponding uplink (UL) grant and a PUSCH without a corresponding downlink assignment index (DAI); or the first PUSCH is any one of a semi-persistent scheduling (SPS) PUSCH, a grant-free PUSCH, a PUSCH having a corresponding UL grant but no DAI in the UL grant.

In a third aspect a UE including a first transceiver and a first processor, wherein, the first transceiver is configured to receive configuration information for indicating whether transmission of uplink control information (UCI) on a first physical shared channel (PUSCH) is supported; the first transceiver is further configured to transmit the first PUSCH and/or the UCI based on the configuration information.

Optionally, the first transceiver is further configured to: when the configuration information indicates that the transmission of the UCI on the first PUS CH is not supported, transmitting only the first PUSCH on transmission resource of the first PUSCH, or the first processor is configured to determine that there is no UCI on the first PUSCH.

Optionally, when the configuration information indicates that the transmission of the UCI on the first PUSCH is not supported, the first transceiver is further configured to: if the UCI exists at a transmission time of the first PUSCH, transmit the first PUSCH on a transmission resource of the first PUSCH, and transmit the UCI on a transmission resource of the UCI, wherein the transmission resource of the UCI does not overlap with the transmission resource of the first PUSCH; or if the UCI exists at the transmission time of the first PUSCH, delay to transmit the UCI at a first predetermined time; or transmit the first PUSCH on the transmission resource of the first PUSCH at a first transmission time, and transmit the UCI on the transmission resource of the UCI at a second transmission time, wherein the first transmission time does not overlap with the second transmission time.

Optionally, when the configuration information indicates that the transmission of the UCI on the first PUSCH is supported, the first transceiver is further configured to: if the UCI exists at a transmission time of the first PUSCH, transmit the UCI on the first PUSCH; or if the UCI exists at the transmission time of the first PUSCH, and when simultaneous transmission of a physical uplink control channel (PUCCH) and the PUSCH are not supported, transmit the UCI on the first PUSCH; or transmit the UCI on the first PUSCH based on a predefined or configured quantity of bits of UCI.

Optionally, the first transceiver is further configured to receive higher layer signaling, Media Access Control (MAC) signaling, or L1 signaling, the higher layer signaling, the MAC signaling, or the L1 signaling includes the configuration information.

Optionally, the L1 signaling is transmitted through a physical downlink control channel (PDCCH).

Optionally, the PDCCH is a multicast PDCCH or a UE-specific PDCCH, and the UE-specific PDCCH is a PDCCH corresponding to the first PUSCH.

Optionally, the configuration information is first indication information of a predetermined quantity of bits, wherein a first state of the first indication information indicates that transmission of the UCI on the first PUSCH is supported, and a second state of the first indication information indicates that transmission of the UCI on the first PUSCH is not supported.

Optionally, the configuration information is a first configuration parameter, the first configuration parameter is "TRUE" indicating that that transmission of the UCI on the first PUSCH is supported, and the first configuration parameter is "FALSE" indicating that that transmission of the UCI on the first PUSCH is not supported.

Optionally, the UCI is one or more of a HARQ-ACK and CSI.

Optionally, the configuration information is only applied only to HARQ-ACK; or the configuration information is only applied to CSI; or the configuration information is applied to HARQ-ACK and CSI.

Optionally, the configuration information is applied to HARQ-ACK and CSI includes: the HARQ-ACK and the CSI correspond to the same configuration information, or the HARQ-ACK and the CSI correspond to independent configuration information, respectively.

Optionally, the first processor is further configured to: determine whether at least one of predetermined conditions is met, and when at least one of the predetermined conditions is met, receive the configuration information; wherein the predetermined conditions include one or more of: the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

Optionally, the first PUSCH is any one of a PUSCH without a corresponding uplink (UL) grant and a PUSCH without a corresponding downlink assignment index (DAI); or the first PUSCH is any one of a semi-persistent scheduling (SPS) PUSCH, a grant-free PUSCH, a PUSCH having a corresponding UL grant but no DAI in the UL grant.

A fourth aspect, a network side device includes a second transceiver and a second processor, the second transceiver is configured to transmit configuration information for indicating whether transmission of UCI on a first PUSCH is supported; the second transceiver is further configured to receive the first PUSCH and/or the UCI based on the configuration information.

Optionally, when the configuration information indicates that the transmission of the UCI on the first PUSCH is not supported, the second transceiver is further configured to: receive only the first PUSCH on transmission resource of the first PUSCH, or the second processor is configured to determine that there is no UCI on the first PUSCH.

Optionally, when the configuration information indicates that the transmission of the UCI on the first PUSCH is not supported, the second transceiver is further configured to: if the UCI exists at a transmission time of the first PUSCH, receive the first PUSCH on a transmission resource of the first PUSCH, and receive the UCI on a transmission resource of the UCI, wherein the transmission resource of the UCI does not overlap with the transmission resource of the first PUSCH; or, delay to receive the UCI at a first predetermined time; or receive the first PUSCH on the transmission resource of the first PUSCH at a first receiving time, and receive the UCI on the transmission resource of the UCI at a second receiving time, wherein the first receiving time does not overlap with the second receiving time.

Optionally, when the configuration information indicates that the transmission of the UCI on the first PUSCH is supported, the second transceiver is further configured to: if the UCI exists at a transmission time of the first PUSCH, receive the UCI on the first PUSCH; or if the UCI exists at the transmission time of the first PUSCH, and when simultaneous transmission of a physical uplink control channel (PUCCH) and the PUSCH are not supported, receive the UCI on the first PUSCH; or receive the UCI on the first PUSCH based on a predefined or configured quantity of bits of UCI.

Optionally, the second transceiver is further configured to transmit higher layer signaling, MAC signaling, or L1 signaling, the higher layer signaling, the MAC signaling, or the L1 signaling comprises the configuration information.

Optionally, the L1 signaling is transmitted through a PDCCH.

Optionally, the PDCCH is a multicast PDCCH or a UE-specific PDCCH, and the UE-specific PDCCH is a PDCCH corresponding to the first PUSCH.

Optionally, the configuration information is first indication information of a predetermined quantity of bits, wherein a first state of the first indication information indicates that transmission of the UCI on the first PUSCH is supported, and a second state of the first indication information indicates that transmission of the UCI on the first PUSCH is not supported.

Optionally, the configuration information is a first configuration parameter, the first configuration parameter is "TRUE" indicating that that transmission of the UCI on the first PUSCH is supported, and the first configuration parameter is "FALSE" indicating that that transmission of the UCI on the first PUSCH is not supported.

Optionally, the UCI is one or more of HARQ-ACK and CSI.

Optionally, the configuration information is only applied only to HARQ-ACK; or the configuration information is only applied to CSI; or the configuration information is applied to HARQ-ACK and CSI.

Optionally, the configuration information is applied to HARQ-ACK and CSI includes: the HARQ-ACK and the CSI correspond to the same configuration information, or the HARQ-ACK and the CSI correspond to independent configuration information, respectively.

Optionally, the second processor is further configured to: determine whether at least one of predetermined conditions is met, and when at least one of the predetermined conditions is met, transmit the configuration information; the predetermined conditions include one or more of: the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

Optionally, the first PUSCH is any one of a PUSCH without a corresponding uplink (UL) grant and a PUSCH without a corresponding downlink assignment index (DAI); or the first PUSCH is any one of a semi-persistent scheduling (SPS) PUSCH, a grant-free PUSCH, a PUSCH having a corresponding UL grant but no DAI in the UL grant.

In a fifth aspect, a UE includes a memory, a processor, a transceiver, and a computer program stored in the memory and executed by the processor to implement the steps of the transmission method.

In a sixth aspect, a network side device includes a memory, a processor, a transceiver, and a computer program stored in the memory and executed by the processor to implement the steps of the transmission method.

In a seventh aspect, a computer-readable storage medium having a computer program stored thereon, when executed by a processor, implementing the step of the transmission method.

The configuration is used to determine to transmit the UCI on the first PUSCH, so as to avoid the problem that since the understanding on the resource actually occupied by the data transmission on the PUSCH between the UE and the network side device are inconsistent due to whether the UCI exists, thereby ensuring the correct reception of PUSCH by the network side device and improving transmission performance.

DETAILED DESCRIPTION

In the following, the technical solutions in the embodiments of the present disclosure will be clearly and completely described with reference to the drawings. Obviously, the described embodiments are part of embodiments of the present disclosure, but not all of them. Based on the embodiments of the present disclosure, all other embodiments obtained by a person skilled in the art without creative work shall fall within the protection scope of the present disclosure.

The term "and/or" used herein is merely an association relationship that describes associated objects, it means that there are three relationships, e.g., A and/or B means that A alone, both A and B, and B alone.

The terms "first" and "second" are used to distinguish different objects, not to define a specific order of the objects. For example, the first information and the second information or the like are used to distinguish different information, and not used to describe a specific order of information.

The terms "for example" is used for an example or illustration. Any embodiment or design described as "illustrate" or "for example" shall not be interpreted to be a preferred embodiment or design. Specifically, the term "illustrate" or "for example" is intended to present the relevant concepts in a specific manner.

Figure 1:
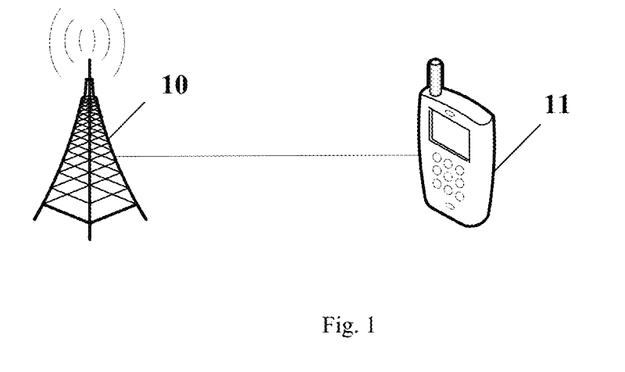
FIG. 1 is a schematic diagram of a wireless communication system according to an embodiment of the present disclosure.

Embodiments of the present disclosure are described below with reference to the drawings. The method or device of transmitting a downlink control channel, the method or device of receiving a downlink control channel provided in the embodiments of the present disclosure may be applied to a wireless communication system. The wireless communication system may be a system employing a fifth generation mobile communication technology (hereinafter referred to as a 5G system for short). Referring to FIG. 1, which is a schematic diagram of an architecture of a wireless communication system according to an embodiment of the present disclosure. As shown in FIG. 1, the wireless communication system may include a network side device 10 and a UE, for example, denoted as UE11, and a UE 11 may communicate with the network side device 10. In practical applications, the connection between the above-mentioned devices may be a wireless connection. To conveniently and intuitively represent the connection relationship between the devices, a solid line is used in FIG. 1.

It should be noted that the communication system may include a plurality of UEs, a network side device which may communicate (transmit signaling or transmit data) with the plurality of UEs.

The network side device provided in the embodiments of the present disclosure may be a base station. The network side device may be a commonly used base station, an evolved node base station (eNB), or a network side device (e.g., a gNB or a transmission and reception point (TRP)) in the 5G system.

The user terminal provided in the embodiments of the present disclosure may be a mobile phone, a tablet computer, a notebook computer, an Ultra-Mobile Personal Computer (UMPC), a netbook, a Personal Digital Assistant (PDA), or the like.

Figure 2:
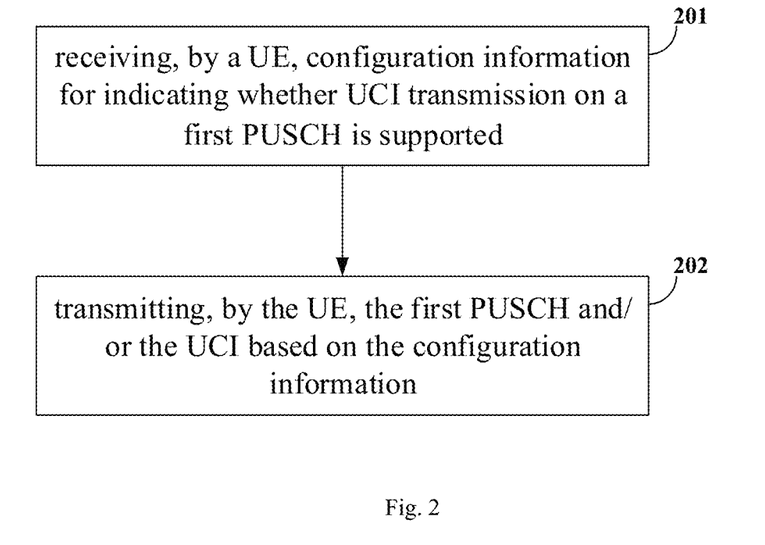
FIG. 2 is a flow chart of a transmission method according to an embodiment of the present disclosure.

Referring to FIG. 2, which is a flow chart of a transmission method, and the specific steps are as follows.

Step 201: receiving, by a UE, configuration information for indicating whether UCI transmission on a first PUSCH is supported.

In an embodiment of the present disclosure, the UE may acquire configuration information by receiving any one of higher layer signaling, medium access control (MAC) signaling, and L1 signaling, the L1 signaling is transmitted through a physical downlink control channel (PDCCH). The PDCCH is a multicast PDCCH or a UE-specific PDCCH. Optionally, the UE-specific PDCCH may be a PDCCH corresponding to the first PUSCH.

In an embodiment of the disclosure, the configuration information is first indication information of a predetermined quantity of bits, for example, the first indication information of 1 bit. A first state of the first indication information (for example, "0") indicates that UCI transmission on the first PUSCH is supported, and a second state of the first indication information (for example, "1") indicates that UCI transmission on the first PUSCH is not supported, and vice versa. That is, the first state is "1", and the second state is "0". It should be appreciated that the form of the first indication information is not limited.

In the embodiment of the present disclosure, the configuration information is a first configuration parameter, a first state of the first configuration parameter (e.g., "TRUE") indicates that UCI transmission on the first PUSCH is supported, and a second state of the first configuration parameter (e.g., "FALSE") indicates that UCI transmission on the first PUSCH is not supported.

In an embodiment of the present disclosure, the UCI is one or more of a hybrid automatic repeat request acknowledgement (HARQ-ACK) and channel state information (CSI).

Further, the configuration information is only applied to the HARQ-ACK, that is, the configuration information is only defined for the HARQ-ACK. Alternatively, the configuration information is only applied to the CSI, that is, and the configuration information is only defined for the CSI.

Alternatively, the configuration information is applied to the HARQ-ACK and the CSI, that is, the configuration information is defined for both the HARQ-ACK and the CSI.

Further, when the configuration information is defined for the HARQ-ACK and the CSI at the same time, the HARQ-ACK and the CSI correspond to the same configuration information, that is, the HARQ-ACK and the CSI may share the same configuration information, or the HARQ-ACK and the CSI correspond to independent configuration information, that is, independent configuration information is defined for the HARQ-ACK and the CSI, respectively.

In one embodiment, before S201 is performed, it is necessary to determine whether at least one of the predetermined conditions is satisfied. When at least one of the predetermined conditions is satisfied, step 201 is performed. Otherwise, step 201 may not be performed. The predetermined conditions may include one or more of the quantity of bits of the HARQ-ACK being greater than the predetermined number of bits, for example, more than 2 bits; the HARQ-ACK being transmitted on the PUSCH in a rate matching mode; and simultaneous transmission of PUCCH and PUSCH is not supported.

In an embodiment of the present disclosure, in one defined way, the first PUSCH is any one of the PUSCH without a corresponding UL grant and the PUSCH without a corresponding DAI. Alternatively, in another defined way, the first PUSCH is any one of SPS PUSCH, grant-free PUSCH, and PUSCH with corresponding UL grant but without DAI in UL grant.

Step 202: transmitting, by the UE, the first PUSCH and/or the UCI based on the configuration information.

For example, when the configuration information does not support transmission of the UCI on the first PUSCH, the UE transmits only the first PUSCH on the transmission resource of the first PUSCH, or the UE determines that there is no UCI on the first PUSCH.

For another example, when the configuration information does not support transmission of the UCI on the first PUSCH, if the UCI exists at the transmission time of the first PUSCH, the UE transmits the first PUSCH on the transmission resource of the first PUSCH, and transmits the UCI on the transmission resource of the UCI. The transmission resource of the UCI does not overlap the transmission resource of the first PUSCH. Alternatively, when the configuration information does not support transmission of the UCI on the first PUSCH, if the UCI exists at the transmission time of the first PUSCH, the UE delays to transmit the UCI at the first predetermined time. Alternatively, when the configuration information does not support transmission of the UCI on the first PUSCH, the UE transmits the first PUSCH on the transmission resource of the first PUSCH at a first transmission time, and transmits the UCI on the transmission resource of the UCI at a second transmission time, the first transmission time and the second transmission time do not overlap.

For example, when the configuration information supports transmission of the UCI on the first PUSCH, if the UCI exists at the transmission time of the first PUSCH, the UE carries the UCI on the first PUSCH for transmission. Alternatively when the configuration information supports transmission of the UCI on the first PUSCH, and if the UCI exists at the transmission time of the first PUSCH, when the simultaneous transmission of PUCCH and PUSCH are not supported, the UE carries the UCI on the first PUSCH for transmission. Alternatively, when the configuration information supports transmission of the UCI on the first PUSCH, the UE transmits the UCI on the first PUSCH in accordance with a predefined or configured quantity of bits of the UCI, regardless of whether UCI exists in the transmission time of the first PUSCH, that is, if the UE does not receive any downlink transmission requiring HARQ-ACK feedback at the first PUSCH transmission time, NACK is generated as the HARQ-ACK feedback information based on the predefined or configured quantity of bits of HARQ-ACK.

In this way, it is determined whether the UCI is transmitted on the first PUSCH by the configuration information, thereby avoiding inconsistent understanding of resources occupied by the data transmission on the PUSCH by the UE and the network side device due to the presence or absence of the UCI, ensuring that the network side device correctly receives the PUSCH, and improving transmission performance.

Figure 3:
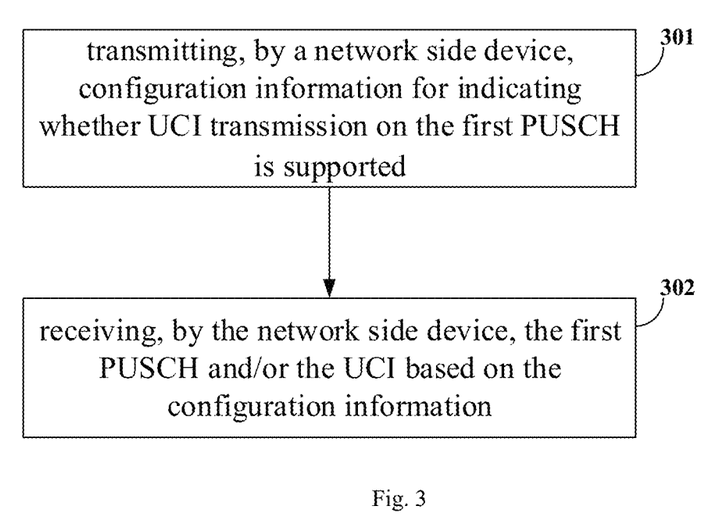
FIG. 3 is another flow chart of a transmission method according to an embodiment of the present disclosure.

Referring to FIG. 3, which shows a flow chart of a transmission method and the steps are as follows.

Step 301: transmitting, by a network side device, configuration information for indicating whether transmission of UCI on the first PUSCH is supported.

In an embodiment of the present disclosure, the network side device transmits configuration information through any one of higher layer signaling, MAC signaling, and L1 signaling. Further, L1 signaling is transmitted through the PDCCH. Further, the PDCCH is a multicast PDCCH or a UE-specific PDCCH, and the UE-specific PDCCH is a PDCCH corresponding to the first PUSCH.

In an embodiment of the present disclosure, the configuration information is first indication information of a predetermined quantity of bits. A first state of the first indication information indicates that UCI transmission on the first PUSCH is supported and a second state of the first indication information indicates that UCI transmission on the first PUSCH is not supported.

In the embodiment of the present disclosure, the configuration information is a first configuration parameter, a first state of the first configuration parameter (e.g., "TRUE") indicates that UCI transmission on the first PUSCH is supported, and a second state of the first configuration parameter (e.g., "FALSE") indicates that UCI transmission on the first PUSCH is not supported.

In an embodiment of the present disclosure, the UCI is one or more of HARQ-ACK and CSI.

In an embodiment of the present disclosure, the configuration information is applied only to the HARQ-ACK; or the configuration information is only applied to the CSI; or the configuration information is applied to the HARQ-ACK and the CSI.

Further, the application of the configuration information to the HARQ-ACK and the CSI includes that the HARQ-ACK and the CSI correspond to the same configuration information, or that the HARQ-ACK and the CSI correspond to independent configuration information, respectively.

In one embodiment, before step 301, it is determined whether at least one of the predetermined conditions is satisfied, and when at least one of the predetermined conditions is satisfied, the network side device transmits configuration information. Otherwise, step 301 may not be performed. The predetermined conditions include one or more: the quantity of bits of HARQ-ACK being greater than the predetermined quantity of bits; the HARQ-ACK being transmitted on the PUSCH in a rate matching mode and simultaneous transmissions of PUCCH and PUSCH being not supported.

In an embodiment of the present disclosure, the first PUSCH is any of PUSCH without a corresponding UL grant, PUSCH without a corresponding DAI. The first PUSCH is any one of: SPS PUSCH, grant-free PUSCH, PUSCH with corresponding UL grant but without DAI in UL grant.

Step 302: receiving, by the network side device, the first PUSCH and/or the UCI based on the configuration information.

For example, when the configuration information does not support transmission of the UCI on the first PUSCH, the network side device receives only the first PUSCH on transmission resources of the first PUSCH, or the network side device determines that there is no UCI on the first PUSCH.

For another example, when the configuration information does not support transmission of the UCI on the first PUSCH, if the UCI exists at a transmission time of the first PUSCH, the network side device receives the first PUSCH on transmission resources of the first PUSCH, and receives the UCI on transmission resources of the UCI, transmission resources of the UCI do not overlap transmission resources of the first PUSCH. Alternatively, when the configuration information does not support transmission of the UCI on the first PUSCH, if the UCI exists at the transmission time of the first PUSCH, the network side device delays to receive the UCI at the first predetermined time. Alternatively, when the configuration information does not support transmission of the UCI on the first PUSCH, the network side device receives the first PUSCH on a transmission resource of the first PUSCH at a first receiving time, and receives the UCI on a transmission resource of the UCI at a second receiving time, the first receiving time and the second receiving time do not overlap.

For another example, when the configuration information supports transmission of the UCI on the first PUSCH, if the UCI exists at the transmission time of the first PUSCH, the network side device receives the UCI on the first PUSCH. Alternatively, when the configuration information supports transmission of the UCI on the first PUSCH, if the UCI exists at the transmission time of the first PUSCH, when simultaneous transmission of the PUCCH and the PUSCH are not supported, the network side device receives the UCI on the first PUSCH. Alternatively, when the configuration information supports transmission of the UCI on the first PUSCH, the network side device receives the UCI on the first PUSCH based a predefined or configured quantity of UCI bits.

In this way, it is determined whether the UCI is transmitted on the first PUSCH by the configuration information, thereby avoiding inconsistent understanding of resources occupied by the data transmission on the PUSCH by the UE and the network side device due to the presence or absence of the UCI, ensuring that the network side device correctly receives the PUSCH, and improving transmission performance.

EXAMPLE 1

The base station transmits configuration information to the UE to indicate that transmission of the HARQ-ACK on the grant-free PUSCH is not supported. For example, the base station transmits a configuration parameter HARQ-ACK_ON_GF indicating "FALSE" through a high layer signaling; the UE receives the higher layer signaling and determines that the configuration parameter HARQ-ACK_ON_GF transmitted by the higher layer signaling is "FALSE", and then determines not to transmit the HARQ-ACK on the grant-free PUSCH.

Figure 4:
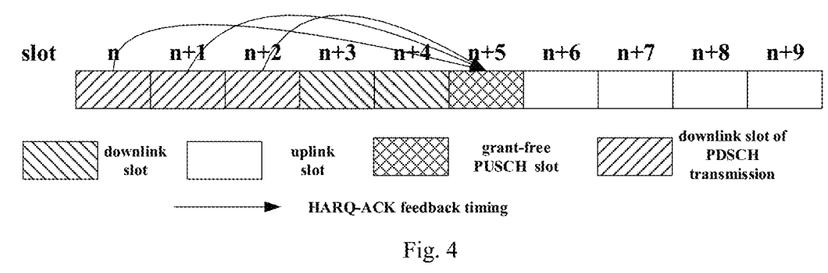
FIG. 4 is a schematic diagram of a scheduling and feedback process according to an embodiment of the present disclosure.

Case 1: As shown in FIG. 4, it is assumed that the base station schedules three PDSCH, and the HARQ-ACKs of the three PDSCH are fed back at the same uplink time (e.g., slot n+5). It is assumed that the time is a time configured for the grant-free PUSCH, and the UE does not support simultaneous transmission of the PUCCH and the PUSCH; Then:

At the UE side, (1) When the UE receives at least one of the three PDSCH, the UE determines that there is HARQ-ACK transmission at the uplink time (slot n+5), and the UE determines one PUCCH resource for transmitting the HARQ-ACKs of the three PDSCH based on the HARQ-ACK resource indication field in the PDCCH for scheduling the three PDSCH, when the base station determines the PUCCH resource, it needs to ensure that the PUCCH resource does not overlap with the resource configured for the grant-free PUSCH (i.e., occupying different RBs). In the uplink time, the UE transmits the HARQ-ACK on the PUCCH resource and transmits the PUSCH on the grant-free PUSCH resource, respectively.

(2) When the UE loses the three PDSCH, the UE determines that there is no HARQ-ACK transmission at the uplink time, and the UE transmits PUSCH on the grant-free PUSCH resource at the uplink time.

At the base station side, (1) PUSCH is received on the resources configured for the grant-free PUSCH, since the HARQ-ACK of the downlink transmission is not carried on the PUSCH regardless of whether the UE loses packets for the downlink transmission, and the PUSCH transmission on the resources of the grant-free PUSCH is not affected regardless of whether the UE transmits the HARQ-ACK;

(2) HARQ-ACK is received on the indicated PUCCH resource, when the information is received, it is determined whether to retransmit the three PDSCH based on the received HARQ-ACK, and when no information is received (that is, the detection result on the PUCCH resource is discontinuous transmission (DTX)), it is determined that the UE loses all downlink transmissions and performs retransmission.

Figure 5:
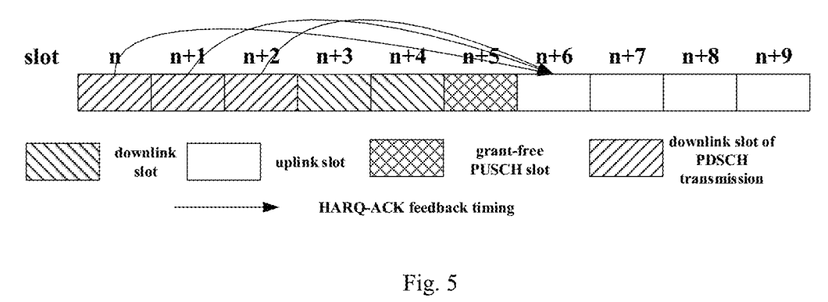
FIG. 5 is a schematic diagram of a scheduling and feedback process according to an embodiment of the present disclosure.

Case 2: As shown in FIG. 5, it is assumed that the base station configures the grant-free PUSCH in the slot n+5, the base station schedules three PDSCH, and the HARQ-ACK of the two PDSCH are fed back at the same uplink time (e.g., slot n+6), the base station ensures that the feedback time is different from the time configured for the grant-free PUSCH by scheduling and/or configuring; Then:

(1) The UE transmits the PUSCH on the grant-free PUSCH resource at the uplink time slot n+5; when the UE receives at least one of the three PDSCH, the UE determines that a HARQ-ACK transmission exists in an uplink time (slot n+6), and the UE transmits the HARQ-ACK in the slot n+6, and may transmit through the PUCCH. When a PUSCH with a corresponding UL grant or a PUSCH with a corresponding UL grant and a DAI existed in the UL grant in the slot n+6, if the UE does not support simultaneous transmission of the PUCCH and the PUSCH, the UE carries the HARQ-ACK on the PUSCH with the corresponding UL grant or the PUSCH with the corresponding UL grant and the DAI existed in the UL grant for transmission.

(2) When the UE loses the three PDSCH, the UE determines that there is no HARQ-ACK transmission in the uplink time slot n+5, and the UE transmits PUSCH on the grant-free PUSCH resource in the slot n+5.

At the base station side,

The PUSCH is received on the resource configured for the grant-free PUSCH in the slot n+5. Since the HARQ-ACK of the downlink transmission is not carried on the PUSCH for transmission regardless of whether the UE loses packets for the downlink transmission, the PUSCH transmission on the resource of the grant-free PUSCH is not affected regardless of whether the UE transmits the HARQ-ACK.

In the slot n+6, if the PUSCH with the corresponding UL grant or the PUSCH with the corresponding UL grant and the DAI exited in the UL grant is not scheduled, the HARQ-ACK is received on the indicated PUCCH resource. When the information is received, it is determined whether to retransmit the three PDSCH based on the received HARQ-ACK. When the information is not received (that is, the detection result on the PUCCH resource is DTX), it is determined that the UE loses all downlink transmissions and performs retransmission. If a PUSCH with a corresponding UL grant or a PUSCH with a corresponding UL grant and a DAI existed in the UL grant is scheduled, when the UE does not support simultaneous transmission of the PUCCH and the PUSCH, the HARQ-ACK and the data are received on the scheduled PUSCH. In this case, because there is the quantity of bits that DAI is used to indicate the HARQ-ACK, it helps the UE to determine whether the HARQ-ACK exists on the PUSCH. Even if the UE loses three downlink transmissions, since it is notified in the UL grant that a feedback bits quantity of the HARQ-ACK is greater than 0, it means that the downlink transmission exists, the UE needs to generate a NACK as feedback information based the indicated feedback bits quantity of the HARQ-ACK, so as to ensure that the UE can correctly determine whether the HARQ-ACK transmission exists on the PUSCH regardless of whether the UE loses the downlink transmission. When the HARQ-ACK performs rate matching transmission with the data on the PUSCH, it is ensured that the UE and the base station have consistent understanding of a rate matching result and mapping resources of the HARQ-ACK and the data, and that the base station can correctly parse the PUSCH.

In the above embodiment, for example, the grant-free PUSCH may be replaced by SPS PUSCH or the PUSCH having a corresponding UL grant, but without DAI in UL grant. Of course, the present disclosure can also be applied to any other PUSCH, such as PUSCH having a corresponding UL grant, and with DAI existed in UL grant.

It should be noted that in the above-described embodiment, HARQ-ACK is used as an example, and HARQ-ACK can also be replaced with CSI. Then, the feedback time of CSI can be determined based on the pre-configured CSI period and/or notification signaling for triggering CSI feedback. For CSI, whether CSI_ON_GF parameter configuration supports CSI transmission on the first PUSCH can be defined. The specific procedure is similar and will not be described herein.

In case 2 of the above-described embodiment, taking the HARQ-ACK and the first PUSCH being transmitted in different slots as an example, the HARQ-ACK may also occupy different symbol transmissions in the same slot.

EXAMPLE 2

The base station transmits configuration information to the UE to indicate that transmission of the HARQ-ACK on the grant-free PUSCH is supported, for example, a configuration parameter HARQ-ACK_ON_GF indicating "TRUE" is transmitted by a high layer signaling. The UE receives the higher layer signaling and determines that the configuration parameter HARQ-ACK_ON_GF transmitted by the higher layer signaling is "TRUE", and then determines that the HARQ-ACK may be transmitted on the grant-free PUSCH. For example, for case 1 in Example 1, there are two implementations as follows.

In one implementation, if there is a HARQ-ACK at a transmission time of the first PUSCH, when simultaneous transmission of the PUCCH and the PUSCH is not supported, if the UE receives a downlink transmission, the UE carries the HARQ-ACK on the grant-free PUSCH in the slot n+5 for transmission, and if the UE does not receive a downlink transmission, only the grant-free PUSCH is transmitted in the slot n+5 without carrying the HARQ-ACK. In this case, the base station may determine whether the UE transmits the HARQ-ACK on the grant free PUSCH in a specific manner. For example, the UE carries indication information on the grant-free PUSCH to indicate whether the HARQ-ACK exists or not, or the base station performs blind detection by assuming that the HARQ-ACK exists or not.

In another implementation, the UE always transmits the HARQ-ACK on the grant-free PUSCH based on a pre-defined or configured quantity of bits of HARQ-ACK. Even if the UE loses all downlink transmissions for which the HARQ-ACK feedback is performed in the slot n+5, the UE needs to generate a NACK having a corresponding quantity of bits to transmit on the grant-free PUSCH in the slot n+5, so as to avoid that the understanding of the base station on whether the HARQ-ACK exists on the grant-free PUSCH in the slot n+5 is inconsistent with the UE because the UE loses downlink data, thereby causing the understanding of the base station on that the mapping resource and the rate matching result of the data on the grant-free PUSCH in the slot n+5 are inconsistent with the actual transmission of the UE, so that the base station fails to receive the grant-free PUSCH in the slot n+5. For example, in a case of a fixed HARQ-ACK codebook and/or a case of fixed HARQ-ACK feedback timing, the HARQ-ACK transmission on the grant-free PUSCH may be configured to be supported. In this case, the feedback bits quantity of HARQ-ACK corresponding to each feedback time may be determined based on the fixed HARQ-ACK codebook and/or the fixed HARQ-ACK feedback timing. Even if the UE does not receive the downlink transmission at the downlink time corresponding to the HARQ-ACK at the feedback time, the UE may generate a NACK as the feedback information based on the determined feedback bits quantity of HARQ-ACK, thereby ensuring that the grant-free PUSCH always allocates the fixed resources to the HARQ-ACK transmission of the fixed bits, and the remaining resources are used for the rate matching of data and as mapping transmission resources, thereby ensuring that the base station correctly receives the grant-free PUSCH.

The embodiment of the present disclosure also provides a UE. Since the principle of solving a problem by the UE is similar to the transmission method in the above embodiment of the present disclosure, the implementation of the UE may refer to the implementation of the method, and repeated parts are not described again.

Figure 6:
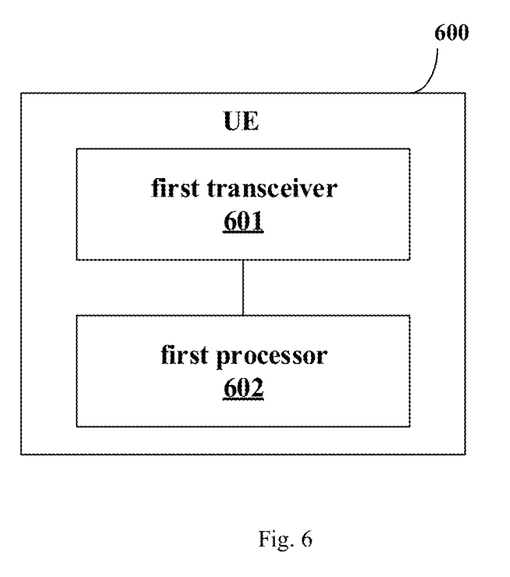
FIG. 6 is a schematic diagram of a UE according to an embodiment of the present disclosure.

Referring to FIG. 6, which shows the structure of a UE 600 including a first transceiver 601 and a first processor 602.

The first transceiver 601 is configured to receive configuration information indicating whether UCI transmission on a first PUSCH is supported.

The first transceiver 601 is further configured to transmit the first PUSCH and/or the UCI based on the configuration information.

In an embodiment of present disclosure, the first transceiver 601 is further configured to transmit only the first PUSCH on transmission resources of the first PUSCH when the configuration information configuration does not support transmission of the UCI on the first PUSCH, or the first processor 602 is configured to determine that there is no UCI on the first PUSCH.

In an embodiment of present disclosure, the first transceiver 601 is further configured to: when the configuration information configuration does not support transmission of the UCI on the first PUSCH, if the UCI exists at a transmission time of the first PUSCH, transmit the first PUSCH on a transmission resource of the first PUSCH, and transmit the UCI on a transmission resource of the UCI, the transmission resource of the UCI does not overlap the transmission resource of the first PUSCH; or when the configuration information does not support transmission of the UCI on the first PUSCH, if the UCI exists at the transmission time of the first PUSCH, delay to transmit the UCI at a first predetermined time; or when the configuration information does not support transmission of the UCI on the first PUSCH, transmit the first PUSCH on a transmission resource of the first PUSCH at a first transmission time, and transmit the UCI on a transmission resource of the UCI at a second transmission time, the first transmission time and the second transmission time do not overlap.

In an embodiment of present disclosure, the first transceiver 601 is further configured to, when the configuration information supports transmission of the UCI on the first PUSCH, if the UCI exists at the transmission time of the first PUSCH, carry the UCI on the first PUSCH; or when the configuration information supports transmission of the UCI on the first PUSCH, if the UCI exists at a transmission time of the first PUSCH, when the simultaneous transmission of PUCCH and PUSCH are not supported, transmit the UCI on the first PUSCH; or When the configuration information supports the transmission of the UCI on the first PUSCH, transmit the UCI on the first PUSCH in a predefined or configured quantity of UCI bits.

In an embodiment of present disclosure, the first transceiver 601 is further configured to receive higher layer signaling, MAC signaling, or L1 signaling, the higher layer signaling, MAC signaling, or L1 signaling including the configuration information.

In an embodiment of the present disclosure, the L1 signaling is transmitted through PDCCH.

In this embodiment of the present disclosure, the PDCCH is a multicast PDCCH or a UE-specific PDCCH, and the UE-specific PDCCH is a PDCCH corresponding to the first PUSCH.

In an embodiment of present disclosure, the configuration information is first indication information of a predetermined quantity of bits, a first state of the first indication information indicates that transmission of the UCI on the first PUSCH is supported, and a second state of the first indication information indicates that transmission of the UCI on the first PUSCH is not supported.

In an embodiment of present disclosure, the configuration information is a first configuration parameter, the first configuration parameter is "TRUE" indicating that UCI transmission on the first PUSCH is supported, and the first configuration parameter is "FALSE" indicating that UCI transmission on the first PUSCH is not supported.

In an embodiment of the present disclosure, the UCI is one or more of HARQ-ACK and CSI.

In the present disclosed embodiment, the configuration information is applied only to the HARQ-ACK; or the configuration information is only used for CSI; or the configuration information is applied to the HARQ-ACK and the CSI.

In an embodiment of the present disclosure, the configuration information is applied to HARQ-ACK and CSI, including: the HARQ-ACK and the CSI corresponding to the same configuration information, or the HARQ-ACK and the CSI corresponding to independent configuration information, respectively.

In an embodiment of present disclosure, the first processor 602 is further configured to determine whether at least one of predetermined conditions is satisfied, and when at least one of predetermined conditions is satisfied, instruct the first transceiver 601 to receive configuration information. The predetermined condition includes one or more of the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

In the present disclosed embodiment, the first PUSCH is any one of a PUSCH without a corresponding uplink (UL) grant and a PUSCH without a corresponding DAI. Alternatively, the first PUSCH is any one of a semi-persistent scheduling SPS PUSCH, a grant-free PUSCH, and a PUSCH having a corresponding UL grant but no DAI in the UL grant.

The UE provided in the embodiments of the present disclosure can execute the above-mentioned method embodiments. The implementation principles and technical effects thereof are similar, and details are not described herein again.

The embodiment of the present disclosure also provides a network side device. Since the principle of solving the problem of the network side device is similar to the transmission method in the embodiment of the present disclosure, the implementation of the network side device may be referred to the implementation of the method, and repeated parts are not described again.

Figure 7:
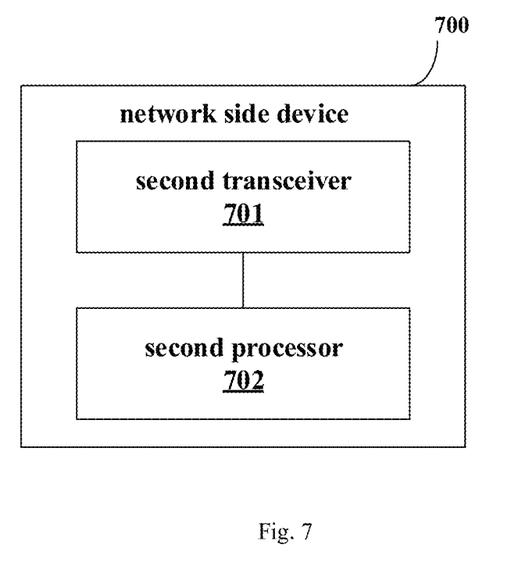
FIG. 7 is a schematic diagram of a network side device according to an embodiment of the present disclosure.

Referring to FIG. 7, which shows an architecture of a network side device 700 including a second transceiver 701 and a second processor 702.

The second transceiver 701 is configured to transmit configuration information for indicating whether UCI transmission on the first PUSCH is supported or not;

The second transceiver 701 is further configured to receive the first PUSCH and/or the UCI based on the configuration information.

In the present disclosed embodiment, the second transceiver 701 is further configured to receive only the first PUSCH on transmission resources of the first PUSCH when the configuration information does not support transmission of the UCI on the first PUSCH, or the second processor 702 is configured to determine that there is no UCI on the first PUSCH.

In the present disclosed embodiment, the second transceiver 701 is further configured to: when the configuration information does not support transmission of the UCI on the first PUSCH, if the UCI exists at a transmission time of the first PUSCH, receive the first PUSCH on a transmission resource of the first PUSCH, and receive the UCI on a transmission resource of the UCI, the transmission resource of the UCI does not overlap with the transmission resource of the first PUSCH; or when the configuration information does not support transmission of the UCI on the first PUSCH, if the UCI exists at a transmission time of the first PUSCH, delay to receive the UCI at a first predetermined time; or when the configuration information does not support transmission of the UCI on the first PUSCH, receive the first PUSCH on a transmission resource of the first PUSCH at a first receiving time, and receive the UCI on a transmission resource of the UCI at a second receiving time, the first receiving time and the second receiving time do not overlap.

In the present disclosed embodiment, the second transceiver 701 is further configured to, when the configuration information supports transmission of the UCI on the first PUSCH, if the UCI exists at the transmission time of the first PUSCH, receive the UCI on the first PUSCH; or when the configuration information supports transmission of the UCI on the first PUSCH, if the UCI exists at a transmission time of the first PUSCH, when simultaneous transmission of the PUCCH and the PUSCH are not supported, receive a UCI on the first PUSCH; or when the configuration information supports transmission of a UCI on the first PUSCH, receive the UCI on the first PUSCH in a predefined or configured quantity of UCI bits.

In this disclosed embodiment, the second transceiver 701 is further configured to transmit higher layer signaling, MAC signaling, or L1 signaling, the higher layer signaling, MAC signaling, or L1 signaling including the configuration information.

In an embodiment of the present disclosure, the L1 signaling is transmitted through a PDCCH.

In an embodiment of the present disclosure, the PDCCH is a multicast PDCCH or a UE-specific PDCCH, and the UE-specific PDCCH is a PDCCH corresponding to the first PUSCH.

In an embodiment of present disclosure, the configuration information is first indication information of a predetermined quantity of bits, a first state of the first indication information indicates that UCI transmission on the first PUSCH is supported, and a second state of the second information indicates that UCI transmission on the first PUSCH is not supported.

In an embodiment of present disclosure, the configuration information is a first configuration parameter, the first configuration parameter is "TRUE" indicating that transmission of the UCI on the first PUSCH is supported, and the first configuration parameter is "FALSE" indicating that transmission of the UCI on the first PUSCH is not supported In embodiments of the present disclosure, the UCI is one or more of HARQ-ACK and CSI.

In the present disclosed embodiment, the configuration information is applied only to the HARQ-ACK; or the configuration information is applied to the CSI only; or the configuration information is applied to the HARQ-ACK and the CSI.

In an embodiment of the present disclosure, the configuration information is applied to HARQ-ACK and CSI, including: the HARQ-ACK and the CSI corresponding to the same configuration information, or the HARQ-ACK and the CSI corresponding to independent configuration information, respectively.

In an embodiment of present disclosure, the second processor 702 is further configured to determine whether at least one of the predetermined conditions is satisfied, and when at least one of the predetermined conditions is satisfied, instruct the second transceiver 701 to transmit configuration information. The predetermined conditions comprise one or more of the quantity of bits of the HARQ-ACK being greater than the predetermined quantity of bits; The HARQ-ACK being transmitted on the PUSCH in a rate matching mode; and simultaneous transmissions of PUCCH and PUSCH being not supported.

In an embodiment of the present disclosure, the first PUSCH is any of a PUSCH without a corresponding UL grant and a PUSCH without a corresponding DAI.

The first PUSCH is any one of the following: SPS PUSCH, grant-free PUSCH, PUSCH with a corresponding UL grant but without DAI in UL grant.

The network side device provided in the embodiment of the present disclosure may execute the above-described method embodiment, and the implementation principles and technical effects thereof are similar, and details are not described herein again.

Figure 8:
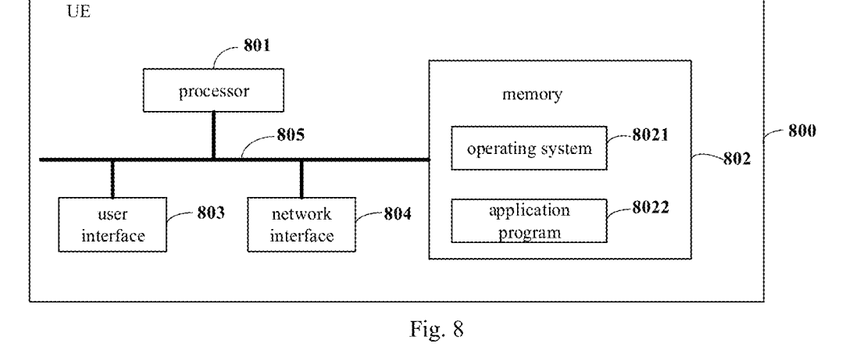
FIG. 8 is another schematic diagram of a UE according to an embodiment of the present disclosure.

As shown in FIG. 8, the UE 800 shown in FIG. 8 includes at least one processor 801, a memory 802, at least one network interface 804, and a user interface 803. The various components in the UE 800 are coupled together by a bus system 805. It will be appreciated that bus system 805 is used for connection and communication between these components. Bus system 805 includes a data bus, a power bus, a control bus, and a status signal bus. For clarity, however, various buses are labeled bus system 805 in FIG. 8.

Therein, the user interface 803 may include a display, a keyboard, or a pointing device (e.g., a mouse, a trackball, a touch pad, a touch screen, or the like).

It will be appreciated that memory 802 in embodiments of the present disclosure may be volatile memory or non-volatile memory, or may include both volatile and non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which functions as an external cache. By way of example, and not limitation, many forms of RAM are available, such as Static RAM (SRAM), Dynamic RAM (DRAM), Synchronous DRAM (SDRAM), Double Data rate SDRAM (DDRSDRAM), Enhanced SDRAM (ESDRAM), Synchlink DRAM (SLDRAM), and Direct Rambus RAM (DRRAM). The memory 1302 of the systems and methods described in embodiments of the present disclosure is intended to include, but is not limited to, these and any other suitable types of memory.

In some embodiments, memory 802 store the following elements: executable modules or data structures, or subsets thereof, or extended sets thereof, operating system 8021 and application program 8022.

The operating system 8021 includes various system programs, such as a framework layer, a core library layer, a driver layer, and the like, for implementing various basic services and processing hardware-based tasks. The application program 8022 includes various application programs, such as a Media Player, a Browser, and the like, for implementing various application services. A program for implementing the method of the embodiments of the present disclosure may be included in the application program 8022.

In the present disclosed embodiment, a program or instruction stored in the memory 802, specifically, a program or instruction stored in the application program 8022 are called and executed, to implement the following steps: receiving configuration information for indicating whether or not transmission of the uplink control information UCI on the first physical shared channel PUSCH is supported; transmitting the first PUSCH and/or the UCI based on the configuration information.

Figure 9:
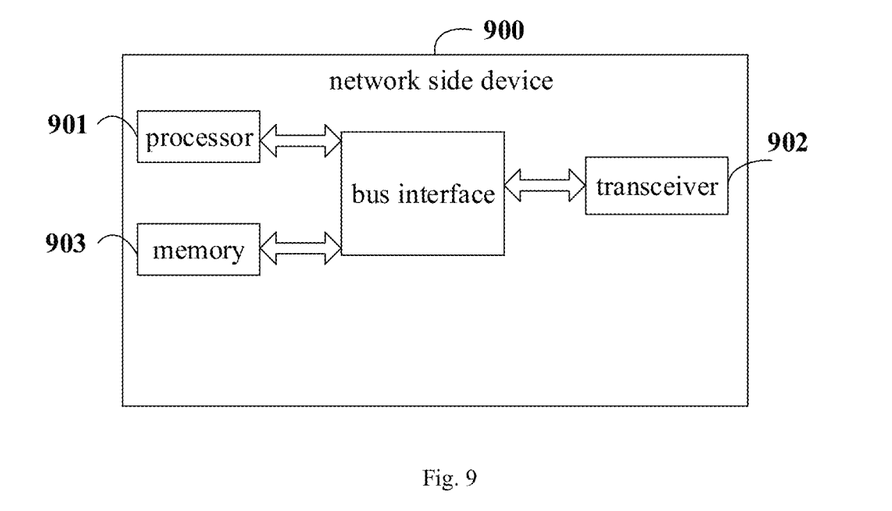
FIG. 9 is another schematic diagram of a network side device according to an embodiment of the present disclosure.

An embodiment of the present disclosure provides a network side device, and FIG. 9 is a schematic structural diagram of the network side device according to the embodiment of the present disclosure. As shown in FIG. 9, the network side device 900 includes a processor 901, a transceiver 902, a memory 903, and a bus interface.

The processor 901 may be responsible for managing the bus architecture and general processing. Memory 903 may store data used by processor 901 to perform operations.

In the embodiment, the network side device 900 may further include a computer program stored in the memory 903 and executed by the processor 901, so as to implement the following steps: transmitting configuration information for indicating whether transmission of the UCI on the first PUSCH is supported; receiving the first PUSCH and/or the UCI based on the configuration information.

In the figures, the bus architecture may include any number of interconnected buses and bridges, various circuit such as one or more processors represented by processor 901 and memory represented by memory 903 are linked together. The bus architecture may also link various other circuits, such as peripherals, voltage regulators, and power management circuits, all of which are well known in the art, and therefore, embodiments of the present disclosure will not be further described. The bus interface provides an interface. The transceiver 902 may be a plurality of elements, including a transmitter and a receiver, providing units for communicating with various other devices on a transmission medium.

The processor 901 is responsible for managing the bus architecture and general processing, and the memory 903 may store data used by the processor 901 to perform operations.

An embodiment of the present disclosure also provides a computer readable storage medium having stored thereon a computer program that, when executed by a processor, implements the steps in the transmission method described above.

The steps of the method or algorithm described in connection with the present disclosure may be implemented in hardware or in software instructions executed by a processor. The software instructions may consist of corresponding software modules, which may be stored in RAM, flash memory, ROM, EPROM, EEPROM, registers, hard disk, removable hard disk, read-only optical disk, or any other form of storage medium well known in the art. An exemplary storage medium is coupled to a processor to enable the processor to read information from and write information to the storage medium. Of course, the storage medium may also be an integral part of the processor. The processor and the storage medium may be located in an ASIC. In addition, the ASIC may be located in a core network interface device. Of course, the processor and the storage medium may also exist as discrete components in the core network interface device.

Those skilled in the art will appreciate that in one or more of the above examples, the functions described in the present disclosure may be implemented in hardware, software, firmware, or any combination thereof. When implemented using software, these functions may be stored in a computer-readable medium or transmitted as one or more instructions or code on the computer-readable medium. A computer-readable medium includes a computer storage medium and a communication medium, the communication medium includes any medium that facilitates transferring a computer program from one place to another. The storage medium may be any available medium accessible to a general purpose or special purpose computer.

The objects, technical solutions, and advantages of the present disclosure are further described in detail, and it is to be understood that the foregoing description is merely specific embodiments of the present disclosure and is not intended to limit the scope of the present disclosure. Any modifications, equivalents and the like, which may be made on the basis of the technical solutions of the present disclosure, are intended to be included within the scope of the present disclosure.

It will be appreciated by those skilled in the art that the disclosed embodiments may be provided as a method, system, or computer program product. Thus, embodiments of the present disclosure may take the form of fully hardware embodiments, fully software embodiments, or embodiments combining software and hardware. Moreover, embodiments of the present disclosure may take the form of a computer program product embodied on one or more computer usable storage media (including, but not limited to, magnetic disk memory, CD-ROM, optical memory, etc.) having computer usable program code embodied therein.

Embodiments of the present disclosure are described with reference to flow charts and/or block diagrams of methods, devices, and computer program products according to embodiments of the present disclosure. It is to be understood that each flow and/or block in the flow diagrams and/or block diagrams, and combinations of flow and/or block in the flow diagrams and/or block diagrams may be implemented by computer program instructions. These computer program instructions may be provided to a processor of a general purpose computer, special purpose computer, embedded processor, or other programmable data processing device to produce a machine such that the instructions executed by the processor of the computer or other programmable data processing device produce means for implementing the functions specified in the flow and/or block in the flow diagrams and/or block diagrams.

These computer program instructions may also be stored in a computer-readable memory capable of directing a computer or other programmable data processing apparatus to operate in a particular manner, such that the instructions stored in the computer-readable memory produce an article of manufacture including instruction that perform the functions specified in the flowchart flow or flows and/or block diagram block or blocks.

These computer program instructions may also be loaded onto a computer or other programmable data processing device such that a series of operational steps are performed on the computer or other programmable device to produce a computer-implemented process, such that the instructions that execute on the computer or other programmable device provide steps for implementing the functions specified in the flow and/or block in the flow diagrams and/or block diagrams.

It will be apparent to those skilled in the art that various modifications and variations can be made to the embodiments of the disclosure without departing from the spirit and scope of the disclosure. Thus, provided that such modifications and variations of the embodiments of the disclosure are within the scope of the claims of the disclosure and their equivalents, the disclosure is also intended to include such modifications and variations.

What is claimed is:

1. A transmission method, comprising:
 receiving, by a user equipment (UE), configuration information for indicating whether transmission of uplink control information (UCI) on a first physical shared channel (PUSCH) is supported; and
 transmitting, by the UE, the first PUSCH and/or the UCI based on the configuration information;

wherein the first PUSCH is any one of a PUSCH without a corresponding uplink (UL) grant and a PUSCH without a corresponding downlink assignment index (DAI); or the first PUSCH is any one of a semi-persistent scheduling (SPS) PUSCH, a grant-free PUSCH;

wherein the receiving, by the UE, configuration information comprises:

receiving, by the UE, higher layer signaling, Media Access Control (MAC) signaling, or L1 signaling, wherein the higher layer signaling, the MAC signaling, or the L1 signaling comprises the configuration information, wherein the L1 signaling is transmitted through a physical downlink control channel (PDCCH), wherein the PDCCH is a multicast PDCCH;

wherein the configuration information is first indication information of a predetermined quantity of bits, wherein a first state of the first indication information indicates that transmission of the UCI on the first PUSCH is supported, and a second state of the first indication information indicates that transmission of the UCI on the first PUSCH is not supported, or the configuration information is a first configuration parameter, the first configuration parameter is "TRUE" indicating that that transmission of the UCI on the first PUSCH is supported, and the first configuration parameter is "FALSE" indicating that that transmission of the UCI on the first PUSCH is not supported.

2. The transmission method according to claim 1, wherein when the configuration information indicates that the transmission of the UCI on the first PUSCH is not supported, the transmitting, by the UE, the first PUSCH and/or the UCI based on the configuration information comprises one of the following methods:

transmitting, by the UE, only the first PUSCH on transmission resource of the first PUSCH, or determining, by the UE, that there is no UCI on the first PUSCH; or if the UCI exists at a transmission time of the first PUSCH, transmitting, by the UE, the first PUSCH on a transmission resource of the first PUSCH, and transmitting the UCI on a transmission resource of the UCI, wherein the transmission resource of the UCI does not overlap with the transmission resource of the first PUSCH;

if the UCI exists at the transmission time of the first PUSCH, delaying, by the UE, to transmit the UCI at a first predetermined time;

transmitting, by the UE, the first PUSCH on the transmission resource of the first PUSCH at a first transmission time, and transmitting the UCI on the transmission resource of the UCI at a second transmission time, wherein the first transmission time does not overlap with the second transmission time;

and/or wherein when the configuration information indicates that the transmission of the UCI on the first PUSCH is supported, the transmitting, by the UE, the first PUSCH and/or the UCI based on the configuration information comprises one of the following methods:

if the UCI exists at a transmission time of the first PUSCH, transmitting, by the UE, the UCI on the first PUSCH;

if the UCI exists at the transmission time of the first PUSCH, and when simultaneous transmission of a physical uplink control channel (PUCCH) and the PUSCH are not supported, transmitting, by the UE, the UCI on the first PUSCH;

transmitting, by the UE, the UCI on the first PUSCH based on a predefined or configured quantity of bits of UCI.

3. The transmission method according to claim 1, wherein the configuration information is only applied only to HARQ-ACK; or the configuration information is only applied to CSI; or the configuration information is applied to HARQ-ACK and CSI, the configuration information is applied to HARQ-ACK and CSI comprises: the HARQ-ACK and the CSI correspond to the same configuration information, or the HARQ-ACK and the CSI correspond to independent configuration information, respectively.

4. The transmission method according to claim 1, wherein before the UE receives configuration information, the method further comprises:

determining whether at least one of predetermined conditions is met, and when at least one of the predetermined conditions is met, receiving, by the UE, the configuration information;

wherein the predetermined conditions include one or more of: the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

5. A transmission method, comprising:

transmitting, by a network side device, configuration information for indicating whether transmission of UCI on a first PUSCH is supported; and receiving, by the network side device, the first PUSCH and/or the UCI based on the configuration information;

wherein the first PUSCH is any one of a PUSCH without a corresponding uplink (UL) grant and a PUSCH without a corresponding downlink assignment index (DAI); or the first PUSCH is any one of a semi-persistent scheduling (SPS) PUSCH, a grant-free PUSCH;

wherein the transmitting, by a network side device, configuration information comprises:

transmitting, by the network side device, higher layer signaling, Media Access Control (MAC) signaling, or L1 signaling, wherein the higher layer signaling, the MAC signaling, or the L1 signaling comprises the configuration information, wherein the L1 signaling is transmitted through a PDCCH, wherein the PDCCH is a multicast PDCCH;

wherein the configuration information is first indication information of a predetermined quantity of bits, wherein a first state of the first indication information indicates that transmission of the UCI on the first PUSCH is supported, and a second state of the first indication information indicates that transmission of the UCI on the first PUSCH is not supported, or the configuration information is a first configuration parameter, the first configuration parameter is "TRUE" indicating that that transmission of the UCI on the first PUSCH is supported, and the first configuration parameter is "FALSE" indicating that that transmission of the UCI on the first PUSCH is not supported.

6. The transmission method according to claim 5, wherein when the configuration information indicates that the transmission of the UCI on the first PUSCH is not supported, the receiving, by the network side device, the first PUSCH and/or the UCI based on the configuration information comprises one of the following methods:
- receiving, by the network side device, only the first PUSCH on transmission resource of the first PUSCH, or determining, by the network side device, that there is no UCI on the first PUSCH; or
- if the UCI exists at a transmission time of the first PUSCH, receiving, by the network side device, the first PUSCH on a transmission resource of the first PUSCH, and receiving the UCI on a transmission resource of the UCI, wherein the transmission resource of the UCI does not overlap with the transmission resource of the first PUSCH;
- delaying, by the network side device, to receive the UCI at a first predetermined time;
- receiving, by the network side device, the first PUSCH on the transmission resource of the first PUSCH at a first receiving time, and receiving the UCI on the transmission resource of the UCI at a second receiving time, wherein the first receiving time does not overlap with the second receiving time;

and/or wherein when the configuration information indicates that the transmission of the UCI on the first PUSCH is supported, the receiving, by the network side device, the first PUSCH and/or the UCI based on the configuration information comprises one of the following methods:
- if the UCI exists at a transmission time of the first PUSCH, receiving, by the network side device, the UCI on the first PUSCH;
- if the UCI exists at the transmission time of the first PUSCH, and when simultaneous transmission of a physical uplink control channel (PUCCH) and the PUSCH are not supported, receiving, by the network side device, the UCI on the first PUSCH;
- receiving, by the network side device, the UCI on the first PUSCH based on a predefined or configured quantity of bits of UCI.

7. The transmission method according to claim 5, wherein the configuration information is only applied only to HARQ-ACK; or the configuration information is only applied to CSI; or the configuration information is applied to HARQ-ACK and CSI, the configuration information is applied to HARQ-ACK and CSI comprises: the HARQ-ACK and the CSI correspond to the same configuration information, or the HARQ-ACK and the CSI correspond to independent configuration information, respectively.

8. The transmission method according to claim 5, wherein before the transmitting, by a network side device, configuration information, the method further comprises:
- determining whether at least one of predetermined conditions is met, and when at least one of the predetermined conditions is met, transmitting, by the network side device, the configuration information;
- wherein the predetermined conditions include one or more of: the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

9. A UE comprising a first transceiver and a first processor, wherein,
the first transceiver is configured to receive configuration information for indicating whether transmission of uplink control information (UCI) on a first physical shared channel (PUSCH) is supported;
the first transceiver is further configured to transmit the first PUSCH and/or the UCI based on the configuration information;
wherein the first PUSCH is any one of a PUSCH without a corresponding uplink (UL) grant and a PUSCH without a corresponding downlink assignment index (DAI); or the first PUSCH is any one of a semi-persistent scheduling (SPS) PUSCH, a grant-free PUSCH;
wherein the first transceiver is further configured to receive higher layer signaling, Media Access Control (MAC) signaling, or L1 signaling, the higher layer signaling, the MAC signaling, or the L1 signaling comprises the configuration information,
wherein the L1 signaling is transmitted through a physical downlink control channel (PDCCH),
wherein the PDCCH is a multicast PDCCH;
wherein the configuration information is first indication information of a predetermined quantity of bits, wherein a first state of the first indication information indicates that transmission of the UCI on the first PUSCH is supported, and a second state of the first indication information indicates that transmission of the UCI on the first PUSCH is not supported, or the configuration information is a first configuration parameter, the first configuration parameter is "TRUE" indicating that that transmission of the UCI on the first PUSCH is supported, and the first configuration parameter is "FALSE" indicating that that transmission of the UCI on the first PUSCH is not supported.

10. The UE according to claim 9, wherein when the configuration information indicates that the transmission of the UCI on the first PUSCH is not supported the first transceiver is further configured to implement one of the following:
- transmit only the first PUSCH on transmission resource of the first PUSCH, or the first processor is configured to determine that there is no UCI on the first PUSCH; or
- if the UCI exists at a transmission time of the first PUSCH, transmit the first PUSCH on a transmission resource of the first PUSCH, and transmit the UCI on a transmission resource of the UCI, wherein the transmission resource of the UCI does not overlap with the transmission resource of the first PUSCH;
- if the UCI exists at the transmission time of the first PUSCH, delay to transmit the UCI at a first predetermined time;
- transmit the first PUSCH on the transmission resource of the first PUSCH at a first transmission time, and transmit the UCI on the transmission resource of the UCI at a second transmission time, wherein the first transmission time does not overlap with the second transmission time;

and/or when the configuration information indicates that the transmission of the UCI on the first PUSCH is supported, the first transceiver is further configured to implement one of the following:
- if the UCI exists at a transmission time of the first PUSCH, transmit the UCI on the first PUSCH;
- if the UCI exists at the transmission time of the first PUSCH, and when simultaneous transmission of a physical uplink control channel (PUCCH) and the PUSCH are not supported, transmit the UCI on the first PUSCH;

transmit the UCI on the first PUSCH based on a predefined or configured quantity of bits of UCI.

11. The UE according to claim 9,
wherein the configuration information is only applied only to HARQ-ACK; or the configuration information is only applied to CSI; or the configuration information is applied to HARQ-ACK and CSI, the configuration information is applied to HARQ-ACK and CSI comprises: the HARQ-ACK and the CSI correspond to the same configuration information, or the HARQ-ACK and the CSI correspond to independent configuration information, respectively.

12. The UE according to claim 9, wherein the first processor is further configured to:
determine whether at least one of predetermined conditions is met, and when at least one of the predetermined conditions is met, receive the configuration information;
wherein the predetermined conditions include one or more of: the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

13. A network side device comprising a second transceiver and a second processor, wherein
the second transceiver is configured to transmit configuration information for indicating whether transmission of UCI on a first PUSCH is supported;
the second transceiver is further configured to receive the first PUSCH and/or the UCI based on the configuration information;
wherein the first PUSCH is any one of a PUSCH without a corresponding uplink (UL) grant and a PUSCH without a corresponding downlink assignment index (DAI); or the first PUSCH is any one of a semi-persistent scheduling (SPS) PUSCH, a grant-free PUSCH;
wherein the second transceiver is further configured to transmit higher layer signaling, MAC signaling, or L1 signaling, the higher layer signaling, the MAC signaling, or the L1 signaling comprises the configuration information,
wherein the L1 signaling is transmitted through a PDCCH,
wherein the PDCCH is a multicast PDCCH;
wherein the configuration information is first indication information of a predetermined quantity of bits, wherein a first state of the first indication information indicates that transmission of the UCI on the first PUSCH is supported, and a second state of the first indication information indicates that transmission of the UCI on the first PUSCH is not supported, or the configuration information is a first configuration parameter, the first configuration parameter is "TRUE" indicating that that transmission of the UCI on the first PUSCH is supported, and the first configuration parameter is "FALSE" indicating that that transmission of the UCI on the first PUSCH is not supported.

14. The network side device according to claim 13, wherein when the configuration information indicates that the transmission of the UCI on the first PUSCH is not supported, the second transceiver is further configured to implement one of the following:
receive only the first PUSCH on transmission resource of the first PUSCH, or the second processor is configured to determine that there is no UCI on the first PUSCH; or
if the UCI exists at a transmission time of the first PUSCH, receive the first PUSCH on a transmission resource of the first PUSCH, and receive the UCI on a transmission resource of the UCI, wherein the transmission resource of the UCI does not overlap with the transmission resource of the first PUSCH;
delay to receive the UCI at a first predetermined time;
receive the first PUSCH on the transmission resource of the first PUSCH at a first receiving time, and receive the UCI on the transmission resource of the UCI at a second receiving time, wherein the first receiving time does not overlap with the second receiving time;
and/or
when the configuration information indicates that the transmission of the UCI on the first PUSCH is supported, the second transceiver is further configured to implement one of the following:
if the UCI exists at a transmission time of the first PUSCH, receive the UCI on the first PUSCH;
if the UCI exists at the transmission time of the first PUSCH, and when simultaneous transmission of a physical uplink control channel (PUCCH) and the PUSCH are not supported, receive the UCI on the first PUSCH;
receive the UCI on the first PUSCH based on a predefined or configured quantity of bits of UCI.

15. The network side device according to claim 13, wherein the configuration information is only applied only to HARQ-ACK; or the configuration information is only applied to CSI; or the configuration information is applied to HARQ-ACK and CSI, the configuration information is applied to HARQ-ACK and CSI comprises: the HARQ-ACK and the CSI correspond to the same configuration information, or the HARQ-ACK and the CSI correspond to independent configuration information, respectively.

16. The network side device according to claim 13, wherein the second processor is further configured to:
determine whether at least one of predetermined conditions is met, and when at least one of the predetermined conditions is met, transmit the configuration information;
the predetermined conditions include one or more of: the quantity of bits of the HARQ-ACK being greater than a predetermined quantity of bits; the HARQ-ACK being transmitted on the PUSCH in a rate matching mode; and simultaneous transmission of PUCCH and PUSCH being not supported.

* * * * *